Patented Dec. 9, 1930

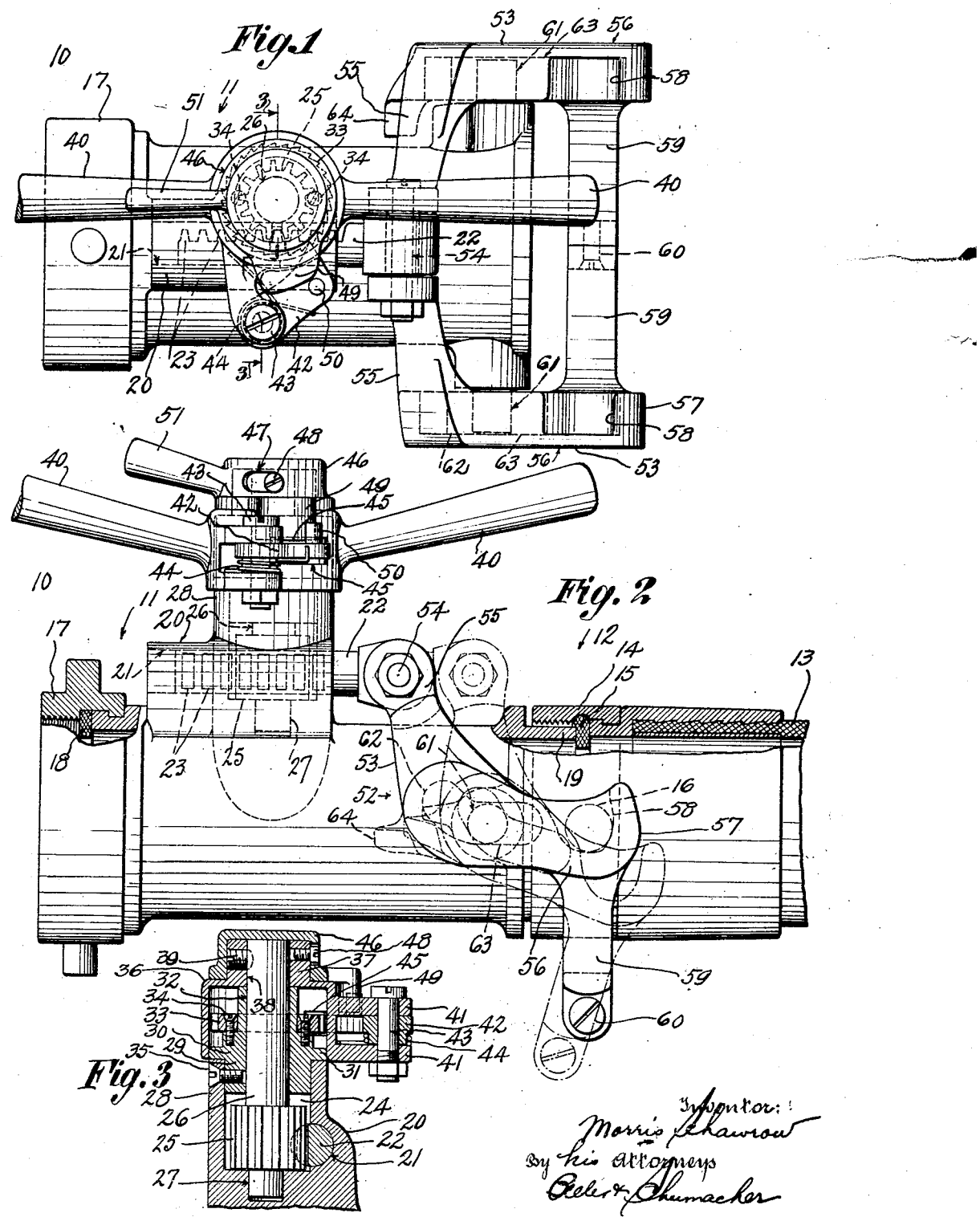

1,784,393

UNITED STATES PATENT OFFICE

MORRIS SCHAWROW, OF BAYONNE, NEW JERSEY

THREADLESS COUPLING

Application filed February 11, 1929. Serial No. 338,991.

This invention relates to couplings.

One object of the invention is to provide a device of the character described having improved means to strongly engage a pair of coupling members, and to permit rapid disengagement thereof.

Another object of the invention is to provide an improved coupling adapted for use with conventional fire hose fittings.

Another object of the invention is the provision of a device of the nature set forth having an improved rotatable means, the operation of which is itself sufficient to strongly interconnect the coupling members.

A further object of the invention is to furnish a device of the type mentioned including an improved lever with which cooperates a tension means fixed to move in a longitudinal path thereof.

A still further object of the invention is to construct a device of the nature set forth comprising few and simple parts, inexpensive to manufacture, rugged and foolproof in construction, requiring a minimum of manipulation, and which is reliable and efficient to a high degree in use.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated on the annexed drawing, wherein like parts are designated by the same reference characters throughout the several views.

In the drawing:

Figure 1 is a top plan view of a device embodying the invention, with a coupling member removed.

Fig. 2 is a side elevation of the same in locked position, showing in dotted lines an open position, and with parts in section.

Fig. 3 is a vertical sectional view taken on line 3—3 of Fig. 1.

The advantages of the invention as here outlined are best realized when all of its features and instrumentalities are combined in one and the same structure, but, useful devices may be produced embodying less than the whole.

It will be obvious to those skilled in the art to which the invention appertains, that the same may be incorporated in several different constructions. The accompanying drawing, therefore, is submitted merely as showing the preferred exemplification of the invention.

Generally described, this invention provides a coupling which may be conceived of as serving to interconnect any two objects. As a specific example of application, the coupling is shown as including a plurality of tubular members. The latter may constitute, for instance, a fire hose coupling, comprising a plurality of coupling members, one of which has a pair of fastener portions or lugs oppositely disposed thereon. On the other coupling member are a plurality of links or levers having at one end lateral hooks to engage the lugs by a movement at an angle to the plane of the lugs. The other end of the links or levers is connected to a member which is movable along a fixed longitudinal path to exert tension on the levers and draw the coupling members tightly together. This member may be in various forms, as a threaded, or toothed member, or as a plain bar operated by a rotatable cam that moves the bar lengthwise. Co-operating in any suitable manner with the member or bar is a pawl and ratchet wheel or its equivalent, which retains the member in set position under tension. It will be appreciated that by a reversal of parts the tension member may operate as a compression member and yet actuate the links or levers in the same manner. While the said tension member may extend along the coupling in any suitable angular relation thereto, yet when this relation is parallel as shown, the said levers due to the improved pivotal mounting thereof, are adapted to move laterally bodily to engage or disengage the lugs.

Referring in detail to the drawing, 10 denotes a device embodying the invention. The same includes a plurality of alined coupling members 11 and 12 for interconnecting any two objects, as, for example, a hose 13 with a hydrant or other water supply (not shown). These couplings are intended for rapid connection in case of fire, and may be of standard construction as to certain details. Thus the coupling 12 includes a rotatable threaded union member 14 and a gasket 15. Disposed exteriorly of the coupling member on opposite sides thereof are a plurality of fastener portions or lugs 16 which lie along an axial plane of the coupling. The said lugs may be of any suitable type, but to conform with the conventional practice, they are preferably in the nature of cylindrical pins. The coupling member 11 may include any suitable connection, as, for instance, a swiveled threaded union member 17 and a gasket 18. By the invention herein set forth, the union member 14 is unnecessary, but it does not interfere with the use of my improved threadless coupling. The latter includes an annular flange portion 19 adapted to enter the member 14 and seat on the gasket 15 to form a fluid tight connection. The means whereby the coupling members 11 and 12 are drawn into close engagement at the said gasket will now be described.

Positioned externally on the coupling member 11 or formed integrally therewith, is an anchor or casing 20 which is offset to one side of the coupling member 11. The casing 20 is spaced considerably from the flange 19 for a purpose hereinafter described. In the lower part of the casing is formed a circular passage 21 to receive a cylindrical member or bar 22, that lies in an axial plane of the coupling at right angles to the plane of the lugs 16. The bar 22 has rack teeth 23 formed thereon, which extend into a space 24 in the said casing, that is adapted to house a pinion 25, the teeth of which mesh with those of the rack. The pinion is fixedly mounted on a short shaft 26, which is journaled at its lower end in a recess 27 in the said casing.

At its upper portion the said casing is formed into a cylindrical wall 28 that receives a hub 29 of a stationary member 30. The latter has an annular shoulder 31 to overlie the wall 28, and is centrally bored at 32 to provide a journal for the upper portion of the shaft 26. Fixed to the member 30 is a ratchet wheel 33 which is alined with the shaft. Preferably, the said ratchet wheel is made of steel, while the member 30 may be made of brass, or other alloy metal. To secure the ratchet wheel to the member 30, and the latter in turn to the casing 20, any well known means may be employed, as, for example, the set screws 34 and 35.

Mounted on the member 30 is a rotatable cylindrical casing 36 whose end wall 37 internally contacts the upper end of the said member, while the side wall thereof takes over the edge of the annular shoulder 31. The said end wall 37 has an axial opening 38 to receive the shaft 26, and a set screw 39 secures the shaft to the said casing 36. The latter has formed integrally therewith a plurality of handles 40 whereby the shaft 26 may be turned.

Extending to one side of the rotatable casing 36, are a pair of arms 41 between which is mounted a pawl 42 by means of a pin 43. A coil spring 44 actuates the pawl to cause the latter to engage the ratchet wheel through an opening 45 in the side of the casing 36.

To lock the pawl in open position, a cap 46 is journaled on the upper end of the rotatable hub or casing 36, said cap being formed with a slot 47 through which extends a set screw 48. The said cap is made with an integral cam portion 49 that extends downward into engagement with a projection or pin 50 on the pawl, whereby the point thereof may be moved out of engagement with the ratchet wheel upon turning the cap in a counterclockwise direction. A finger piece 51 permits easy manipulation of the cap.

To interengage the lugs 16 with the rack bar 22, movable means 52 are provided in the nature of connecting members 53. These are pivotally connected to the rack bar by a pin 54, whence they extend equally in opposite directions at 55, and finally lie at their lower portions in vertical parallel planes at 56. At their free ends 57 the members are formed with laterally opening recesses constituting hooks 58 to engage the lugs 16 by a movement at right angles to the plane of the lugs. The members 53 may be reenforced at their free ends by being secured together by a pair of arms 59 that lie underneath the coupling member 12 and are fastened together by a bolt 60.

Where, as shown, the tension bar 22 is in close proximity to the axis of the coupling, and particularly where it also extends in parallelism thereto, it is desirable to make the members 53 in the nature of levers, and not merely as links, said levers being pivoted on the coupling 11. By this arrangement, moreover, the movement of the members 53 is rendered positive and along a predetermined path. More specifically, pivots 61 are formed on the coupling member 11, and the levers are recessed at 62 to receive the same. The recesses extend in a direction at an angle to the axial plane of the lugs 16, thus permitting the levers to drop as rack bar 22 moves toward the lugs, whereby the separation of the coupling members 11 and 12 is facilitated. The recess 62 may be continued along the plane referred to, as shown at 63 to assure ample clearance between the hooks 58 and the lugs 16, so that should the position of the latter on the coupling member 12 vary, the device 10 could nevertheless be used.

To limit the movement of the levers about the pivots 61, a stop 64 is used, which may be cast with the coupling member 53.

I claim:

1. A device of the character described, including a plurality of separate members, and means to detachably interconnect the same, said means including a single rack and pinion carried by one of the members, a fastener portion on the other member, and a lever pivotally mounted on one of said members, said lever engaging both the rack and the said fastener portion and being swingable to disengage one of them.

2. A device of the character described, including in combination with a plurality of members, of a rack and pinion on one of the members, opposed lugs on the other member, and a lever pivotally mounted on the first member, said lever having movable engagement at one end thereof with the rack, and having detachable engagement with the lugs at its other end in a direction at an angle to the axis of the rack, the engagement between the lever and the first named member including a pivot and a recess along which the pivot is movable relatively, a portion of the recess being at an angle to the axis of the rack to permit the lever to move rapidly laterally out of or into engagement with said pivot due to the pivoting action at the pivot and the relative movement of the same in the recess.

3. A device of the character described, including a plurality of coaxial separate members, a toothed means on one of the members spaced to one side of the axis and extending in a plane thereof, substantially diametrically opposed fastener portions on the other member lying in a plane at an angle to the first mentioned plane, movable means engaging the toothed means and swingable along the plane of the toothed means to engage or disengage the fastener portions, and other means coacting with the toothed means to permit the latter to move and actuate the movable means.

4. A device of the character described, including a plurality of coaxial separate members, a toothed means on one of said members, a plurality of fastener portions oppositely disposed on the other member and offset laterally from the toothed means, movable means detachably interconnecting said fastener portions with said toothed means, and other means coacting with the toothed means to move the latter to actuate the movable means.

5. A device of the character described, including a plurality of coaxial separate members, a toothed means on one of the members spaced to one side of the axis thereof, and extending in a plane of the axis, a plurality of oppositely disposed fastener portions on the other member offset from the toothed means, movable means swingable along the plane of the toothed means to engage or disengage the fastener portions with the toothed means, and other means coacting with the toothed means to cause the same to move the movable means.

6. A device of the character described, including a plurality of alined separate sleeves, a plurality of external fastener means on one of them lying along an axial plane, tension means on the other sleeve detachably engaging said fastener means, said tension means serving to draw the sleeves tightly together, said tension means being laterally offset from said plane, and including a pull member, a shaft, a member secured to the shaft and engaging the pull member to cause the pull member to exert tension on the fastener means upon turning the shaft, and a pawl and ratchet wheel coacting with the shaft to hold the same in set position.

7. A coupling including a plurality of alined sleeves, and means to draw the sleeves strongly together, said means including a bar fixed to slide along one of the sleeves, a shaft at right angles to the bar, a member on the shaft turning therewith to move the bar lengthwise thereof, a pawl and ratchet coacting with the shaft to retain the same in set position, a plurality of opposite fastener portions on the other sleeve lying along a plane at right angles to said shaft, and a lever detachably laterally engaging the fastener portions with said bar.

8. A device of the character described, including a plurality of alined coupling members, a plurality of oppositely disposed lugs on one of them, a rack on the other member extending therealong, said rack being offset from the plane of the lugs, a shaft approximately at right angles to the said plane, a gear fixed on the shaft for said rack, manual means to turn the shaft, a ratchet wheel stationary with respect to the shaft, a pawl movable with the shaft, and a plurality of levers connected each at one end to the rack and at its other end having lateral hooks to engage the lugs by a movement at an angle to the plane of the lugs, said levers being pivotally mounted on the second coupling member, the pivotal connection including a pivot for each lever on the coupling member, and a recess in the lever in which the pivot is movable, said recess extending at an angle to the plane of the lugs to permit the levers to move laterally with respect to the pivots to disengage the lugs.

9. A device of the character described, including a plurality of alined coupling members, a plurality of oppositely disposed lugs on one of them, a plurality of levers on the other coupling member, said levers having lateral hooks to engage the lugs, the second coupling member having pivots, the levers having recesses to movably receive the pivots, the said recesses lying at an angle to the plane of the lugs to permit the levers to move laterally to engage or disengage the lugs, and means on the second coupling member offset laterally from the plane of the lugs in the direction of the hook openings thereof, said means exerting a pull on the other ends of the levers to draw the coupling members tightly together.

10. A coupling including a plurality of coaxial members, power driven means including a single toothed element extending along one of the members, actuating means to move said power means longitudinally along its member, fastening means on the other member, and means including levers acting between said power means and said fastening means to exert a balanced pull between the members upon opposite sides of the axis thereof.

11. A coupling including a plurality of coaxial members, power means including a single toothed element extending along one of the members, actuating means to move said power means longitudinally along its member, fastening means on the other member, and means including levers acting between said power means and said fastening means to exert a balanced pull between the members upon opposite sides of the axis thereof, said levers being pivotally mounted on the member having said power means, the pivotal axis of the levers being movable for movement of the levers along the coupling.

12. A coupling, including a plurality of coaxial members, power means including a single toothed element extending along one of the members, actuating means to move said power means longitudinally along its member, fastening means on the other member, and means including levers acting between said power means and said fastening means to exert a balanced pull between the members upon opposite sides of the axis thereof, said levers being pivotally mounted on the member having said power means, the pivotal axes of the levers being movable for movement of the levers along the coupling and at an angle thereto.

In testimony whereof I affix my signature.

MORRIS SCHAWROW.